United States Patent
Hake (10) Patent No.: US 11,428,381 B2
(45) Date of Patent: Aug. 30, 2022

(54) VEHICLE LIGHTING SYSTEM

(71) Applicant: Ningbo Geely Automobile Research & Development Co., Ltd., Ningbo (CN)

(72) Inventor: Joel Hake, Kållered (SE)

(73) Assignee: Ningbo Geely Automobile Research & Development Co., Ltd.

( * ) Notice: Subject to any disclaimer, the term of this patent is extended or adjusted under 35 U.S.C. 154(b) by 0 days.

(21) Appl. No.: 17/343,574

(22) Filed: Jun. 9, 2021

(65) Prior Publication Data

US 2021/0301999 A1 Sep. 30, 2021

Related U.S. Application Data

(63) Continuation of application No. PCT/CN2019/122403, filed on Dec. 2, 2019.

(30) Foreign Application Priority Data

Dec. 18, 2018 (EP) .................................... 18213501

(51) Int. Cl.
*F21S 43/243* (2018.01)
*F21S 43/249* (2018.01)
(Continued)

(52) U.S. Cl.
CPC ........... *F21S 43/243* (2018.01); *F21S 43/239* (2018.01); *F21S 43/249* (2018.01); *G02B 6/003* (2013.01);
(Continued)

(58) Field of Classification Search
CPC .... G02B 6/0046; F21S 43/235; F21S 43/239; F21S 43/243
See application file for complete search history.

(56) References Cited

U.S. PATENT DOCUMENTS

| 5,839,813 | A | 11/1998 | Smith |
| 2007/0133225 | A1 | 6/2007 | Sakai |
| 2015/0277027 | A1 | 10/2015 | Koizumi et al. |

FOREIGN PATENT DOCUMENTS

| CN | 101749623 A | 6/2010 |
| CN | 105308384 A | 2/2016 |

(Continued)

OTHER PUBLICATIONS

International Search Report and Written Opinion from corresponding International Application No. PCT/CN2019/122403, datedd Mar. 9, 2020, 8 pages.

(Continued)

*Primary Examiner* — Karabi Guharay
(74) *Attorney, Agent, or Firm* — Tucker Ellis LLP (57) ABSTRACT

A vehicle lighting system includes a light source, a first light guide, and a second light guide. The light source is arranged to emit light into the first light guide, which emits incident light from the light source into the second light guide. The second light guide is arranged to emit incident light from the first light guide. The second light guide has a light input surface arranged to receive the incident light from the first light guide, and a light output surface arranged to emit the light received through the second light input surface. The light output surface comprises a first light emitting surface section in a first plane and a second light emitting surface section in a second plane, wherein the first plane and the second plane are arranged at a first angle in relation to each other.

18 Claims, 7 Drawing Sheets

(51) Int. Cl.
*F21S 43/239* (2018.01)
*F21V 8/00* (2006.01)
*F21W 103/10* (2018.01)

(52) U.S. Cl.
CPC ......... *G02B 6/0038* (2013.01); *G02B 6/0046* (2013.01); *F21W 2103/10* (2018.01)

(56) References Cited

FOREIGN PATENT DOCUMENTS

| | | | |
|---|---|---|---|
| DE | 10102774 A1 | 8/2002 | |
| DE | 102012107437 A1 | 6/2014 | |
| DE | 102013104169 A1 | 10/2014 | |
| DE | 102017127663 A1 | 5/2018 | |
| EP | 2270389 A1 | 1/2011 | |
| EP | 2049365 B1 | 12/2017 | |
| FR | 2934353 A1 | 1/2010 | |
| JP | 2000294022 A | 10/2000 | |
| JP | 2011198537 A | 10/2011 | |
| JP | 2015002148 A * | 1/2015 | ............. F21S 43/40 |
| JP | 2017092010 A | 5/2017 | |
| JP | 2017183231 A | 10/2017 | |
| WO | 2016009733 A1 | 1/2016 | |

OTHER PUBLICATIONS

Extended European Search Report from corresponding European Application No. 18213501.2, dated Mar. 1, 2019, 9 pages.

* cited by examiner

VEHICLE LIGHTING SYSTEM

RELATED APPLICATION DATA

This application is a continuation of International Patent Application No. PCT/CN2019/122403, filed Dec. 2, 2019, which claims the benefit of European Patent Application No. 18213501.2, filed Dec. 18, 2018 4, 2018, the disclosures of which are incorporated herein by reference in their entireties.

TECHNICAL FIELD

The present disclosure relates to a vehicle lighting system comprising one or more light sources, a first light guide, and a second light guide. The one or more light sources are arranged to emit light into the first light guide, and the first light guide is arranged to emit incident light from the one or more light sources into the second light guide. The second light guide is arranged to emit incident light from the first light guide.

BACKGROUND

Vehicle lighting systems, such as for example taillights and position lights are used on vehicles to meet safety regulations. Often vehicle lights are integrated in the design of the vehicle to achieve an attractive appearance and establish a specific identity of the vehicle, for example through the design of light patterns. Light guides are commonly used in vehicle lighting applications for guiding light from light sources to light emitting surfaces, such as for example taillights, position lights or similar vehicle lighting structures. In today's vehicle applications, there are high demands on the aesthetic appearance and compact design of lighting structures, as well as the light emitting properties needed to meet safety regulations. One common issue when designing a vehicle lighting structure is to achieve an even light pattern in the light emitting surface and to achieve an even light distribution from the light emitting surface when viewed from different angles. This is especially complicated when the light emitting surface has a non-planar configuration. There is thus a need for an improved vehicle lighting system.

SUMMARY

An object of the present disclosure is to provide a vehicle lighting system where the previously mentioned problems are avoided. This object is at least partly achieved by the features of the independent claims. The dependent claims contain further developments of the vehicle lighting system.

The disclosure concerns a vehicle lighting system comprising one or more light sources, a first light guide, and a second light guide. The one or more light sources are arranged to emit light into the first light guide, and the first light guide is arranged to emit incident light from the one or more light sources into the second light guide. The second light guide is arranged to emit incident light from the first light guide. The first light guide is arranged to redirect the incident light from the one or more light sources from a first light flow direction to a second light flow direction. The second light guide is arranged following the first light guide in the second light flow direction. The first light guide comprises a first light input surface arranged to receive the incident light from the one or more light sources, and a first light output surface arranged to emit the light received from the one or more light sources through the first light input surface. A light reflection surface is arranged for internally reflecting the incident light from the first light input surface toward the first light output surface. The second light guide comprises a second light input surface arranged to receive the incident light from the first light guide, and a second light output surface arranged to emit the light received through the second light input surface. The second light output surface comprises a first light emitting surface section in a first plane and a second light emitting surface section in a second plane, wherein the first plane and the second plane are arranged at a first angle in relation to each other.

Advantages with these features are that the vehicle lighting system can be made in a compact design meeting safety regulations with a configuration where the first plane and the second plane are arranged at a first angle in relation to each other. Further, the first angle is providing an attractive appearance of the vehicle lighting system establishing a specific identity of the vehicle and meeting high demands on the aesthetic appearance of the lighting structure. The construction of the first light guide in combination with the second light guide is establishing an even light pattern in the second light emitting surface and an even light distribution without visible light intensity fluctuations from the light emitting surface when viewed from different angles.

According to an aspect of the disclosure, the first plane and the second plane are arranged at the first angle in relation to each other about a common axis extending in a direction non-parallel to the second light flow direction. The arrangement of the planes at the first angle is establishing the specific identity of the vehicle meeting high demands on the aesthetic appearance of the lighting structure and establishing an efficient light pattern meeting safety demands.

According to another aspect of the disclosure, the first light output surface is arranged in a light output plane and the second light input surface is arranged in a light input plane, wherein a gap is formed between the first light output surface and the second light input surface. The gap is supporting the light distribution between the first light guide and the second light guide for an efficient light flow with an even light distribution without major fluctuations.

According to an aspect of the disclosure, the gap has a smallest dimension between the first light output surface and the second light input surface in the second light flow direction Y within the range 0.1-20 mm.

According to another aspect of the disclosure, the light output plane and the light input plane are arranged parallel or essentially parallel to each other. The configuration with parallel planes is providing an efficient light distribution between the first light guide and the second light guide. The parallel surfaces are allowing the redirected light from the first light guide to be efficiently emitted into the second light guide.

According to a further aspect of the disclosure, the light output plane and the light input plane are arranged perpendicular or essentially perpendicular to the second light flow direction. The arrangement of the light output plane and the light input plane in a perpendicular relationship is providing a simple design of the system with right angles. The angular relationship is further supporting the compact design of the system.

According to an aspect of the disclosure, the first light guide has a tapered cross-sectional configuration between an upper end and a lower end, wherein the first light output surface and the light reflection surface are extending between the upper end and the lower end, wherein the first light output surface is arranged at a second angle in relation to the light reflection surface. The second angle is configuring the first light guide with a wedge shape providing an efficient reflection of light within the first light guide.

According to another aspect of the disclosure, the first light input surface is arranged at the upper end, and wherein the first light input surface is arranged at a third angle in relation to the first light output surface. The design with the first light input surface at the upper end is establishing a simple construction where the light sources are arranged above the first light guide. The third angle is establishing the angular relationship between the first light input surface and the first light output surface, and further the relationship between the first input surface and the light reflection surface when the second angle is known.

According to a further aspect of the disclosure, the light reflection surface comprises a plurality of grooves arranged to redirect the incident light from the one or more light sources, wherein the grooves are arranged between the upper end and the lower end in a parallel or essentially parallel relationship to the first light input surface.

According to an aspect of the disclosure, each groove has a V-shaped configuration comprising a first groove angle and a second groove angle. The V-shaped configuration is efficiently reflecting the light in the first light guide.

According to another aspect of the disclosure, the light reflection surface comprises two or more light reflection sections, wherein the grooves in the respective light reflecting sections have different configurations. The light reflection sections are providing an even more efficient reflection of light emitted from the one or more light sources, since the grooves may have different angles, sizes or individual relationships. Through the light reflection sections, the light emitted from the first light guide can be made more even and controlled, where an even light pattern in the first light emitting surface and an even light distribution without major fluctuations is achieved.

According to a further aspect of the disclosure, the area of the first light output surface is greater than the area of the second light input surface. The relationship between the areas is securing an efficient distribution of light into the second light guide from the first light guide.

According to an aspect of the disclosure, the first input surface comprises one or more lenses arranged to direct the light emitted from the one or more light sources into the first light guide, wherein each of the one or more light sources is cooperating with one of the one or more lenses. The one or more lenses are establishing a directed light into the first light guide for an efficient utilization of light emitted from the one or more light sources.

According to another aspect of the disclosure, the first light emitting surface section comprises a first prism pattern, and the second light emitting surface section comprises a second prism pattern, wherein the respective first and second prism patterns are arranged to direct the light emitted from the second light guide. The prism patterns are used to direct the light emitted from the first light emitting surface section in the first plane and the second light emitting surface section in the second plane that are arranged in relation to each other in an angular relationship. Through the use of prism patterns the emitted light from the second light guide can be emitted into desired directions.

According to an aspect of the disclosure, the first light guide is arranged following the one or more light sources in the first light flow direction.

According to another aspect of the disclosure, the first light output surface comprises a graining structure. The graining structure is securing a more even light distribution.

BRIEF DESCRIPTION OF THE DRAWINGS

The disclosure will be described in greater detail in the following, with reference to the attached drawings, in which.

DETAILED DESCRIPTION

Various aspects of the disclosure are hereinafter described in conjunction with the appended drawings to illustrate and not to limit the disclosure, wherein like designations denote like elements, and variations of the described aspects are not restricted to the specifically shown embodiments, but are applicable on other variations of the disclosure.

Figure 1A:
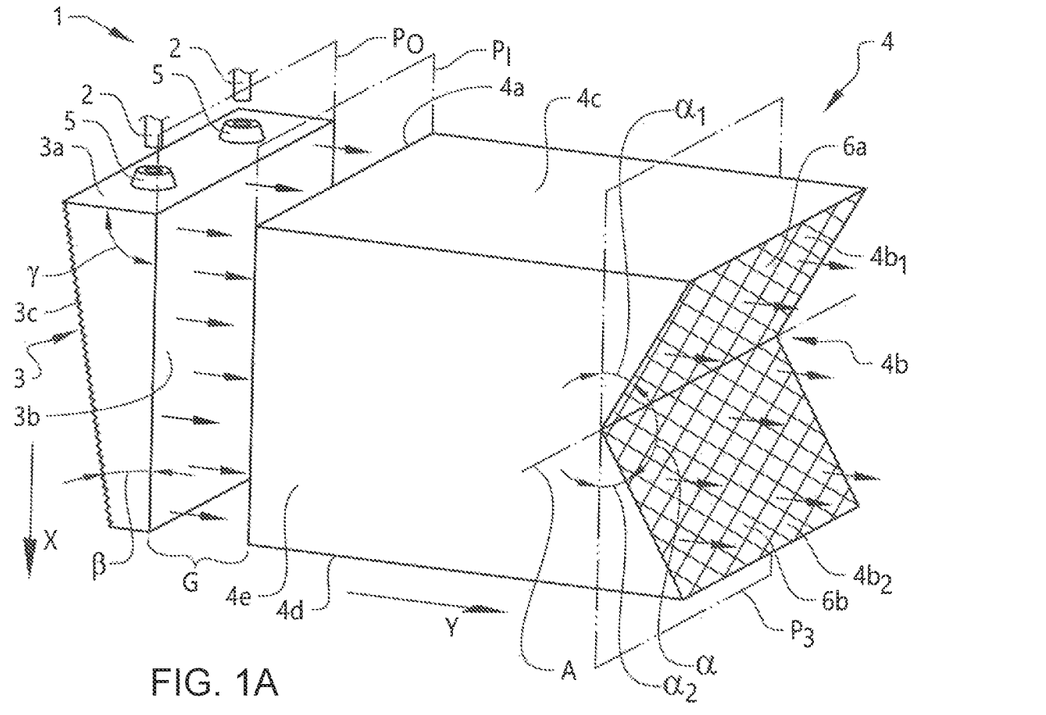
FIG. 1A-1B show schematically, in a perspective view and in a side view a vehicle lighting system with a first light guide and a second light guide according to the disclosure.
Figure 1B:
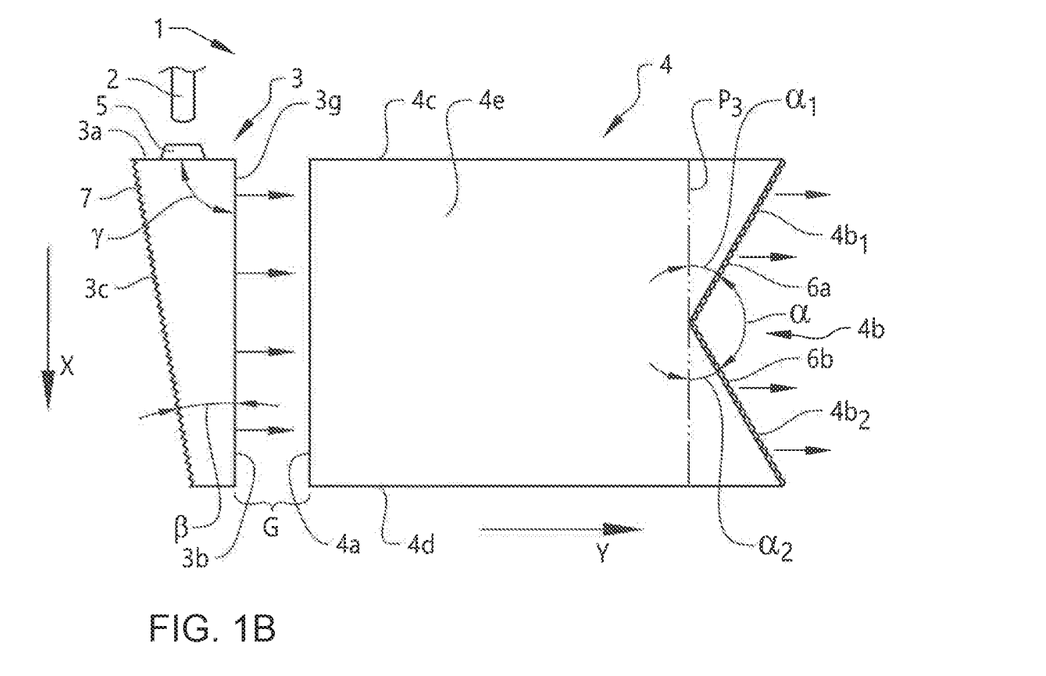

In FIGS. 1A-1B a vehicle lighting system 1 is schematically shown. The vehicle lighting system 1 comprises one or more light sources 2, a first light guide 3, and a second light guide 4. The one or more light sources 2 are arranged to emit light into the first light guide 3, and the first light guide 3 is arranged to emit incident light from the one or more light sources 2 into the second light guide 4. The second light guide 4 is arranged to emit incident light from the first light guide 3.

The light sources 2 may be any suitable light sources for vehicle applications, such as for example light-emitting diodes (LED) having a low energy consumption, a long lifetime and a robust construction. In FIGS. 1A-1B, two light sources 2 are shown, but the lighting system may alternatively comprise only one light source 2 or three or more light sources 2 depending on the design of the vehicle lighting system 1.

As illustrated in FIGS. 1A-1B, the first light guide 3 is arranged to redirect the incident light from the one or more light sources 2 from a first light flow direction X to a second light flow direction Y. The second flow direction Y is arranged at an angle in relation to the first flow direction X. The first light guide 3 is arranged following the one or more light sources 2 in the first light flow direction X. The first light guide 3 is designed and configured so that an even light distribution of the light emitted from the one or more light sources 2 is achieved. The first light guide 3 comprises a first light input surface 3a and a first light output surface 3b. The first light input surface 3a is arranged to receive the incident light from the one or more light sources 2. The first light output surface 3b is arranged to emit the light received from the one or more light sources 2 through the first light input surface 3a.

As shown in FIG. 1A, the first light output surface 3b is arranged in a light output plane $P_O$, and the light output plane $P_O$ is used for defining the second light flow direction Y, wherein the second light flow direction Y is a direction perpendicular to the light output plane $P_O$. The first light flow direction X is a direction of the light entering the first light guide 3 through the first light input surface 3a from the one or more light sources 2. It should be understood that light emitted from the one or more light sources are emitted not only in one single direction, but in different directions within a light emission angle or viewing angle of the light source. Different light sources are having different radiation patterns, and an example of a typical radiation pattern for a light emitting diode (LED) is where most of the energy is emitted within 20° of the direction of maximum light. A maximum light direction for a light source may for example be used to define the first light flow direction X. Different types of light emitting diodes may be used for the one or more light sources 2, and suitable light emitting diodes used in the automotive industry may typically have viewing angles of 60° and/or 120°.

As illustrated in FIGS. 1A-1B, the second light guide 4 is arranged following the first light guide 3 in the second light flow direction Y. The second light guide 4 is designed and configured to emit light from a light emitting output surface with an even light pattern and with an even light distribution when viewed from different angles, without any visible light intensity fluctuations. The second light guide 4 comprises a second light input surface 4a and a second light output surface 4b. The second light input surface 4a is arranged to receive the incident light from the first light guide 3. The second light output surface 4b is arranged to emit the light received through the second light input surface 4a.

Through the configuration of the vehicle lighting system 1, with the first light guide 3 and the second light guide 4, the light emitted from the one or more light sources 2 into the first light guide is distributed through the first light guide 3 and through the second light guide 4 to the second light output surface 4b. The second light output surface 4b thus constitutes a light emitting output surface of the vehicle lighting system through which light is emitted to the surrounding environment in for example a taillight, a position light or other vehicle lighting structure. The light emitted from the one or more light sources 2 is redirected from the first light flow direction X to the second light flow direction Y in the first light guide 3, and through the redirection of light flow, a compact design of the vehicle lighting structure 1 is enabled.

In the embodiments shown in the figures, the first light flow direction X is arranged at about a 90° angle in relation to the second light flow direction Y. However, it should be understood that the first light guide 3 may be arranged to redirect the incident light in other angles than about 90° between the first light flow direction X and the second light flow direction Y. The first light flow direction X and the second light flow direction Y may be arranged in any desired angular relationship relatively each other, and the angle may be different for different designs of the vehicle lighting system 1.

As shown in FIGS. 1A-1B, the first light output surface 3b is arranged in the light output plane $P_O$ and the second light input surface 4a is arranged in a light input plane $P_I$. A gap G is formed between the first light output surface 3b and the second light input surface 4a. The gap G between the first light output surface 3b and the second light input surface 4a is used for securing an even light distribution from the first light guide 3 to the second light guide 4.

In the embodiment shown in FIGS. 1A-1B, the light output plane $P_O$ and the light input plane $P_I$ are arranged parallel or essentially parallel in relation to each other for an efficient light distribution. Thus, in this embodiment, both the light output plane $P_O$ and the light input plane $P_I$ are arranged perpendicular or essentially perpendicular to the second light flow direction Y. To secure an efficient distribution of light into the second light guide 4 from the first light guide 3, the area of the first light output surface 3b can be made greater than the area of the second light input surface 4a, and the first light output surface 3b and the second light input surface 4a may be suitably arranged in an overlapping relationship. If desired, the light output plane $P_O$ and the light input plane $P_I$ may be arranged so that they are non-parallel in relation to each other.

The size of the gap G formed between the first light output surface 3b and the second light input surface 4a may be different depending on the design of the vehicle lighting system 1. In the embodiment shown in FIGS. 1A-1B, the gap G has an extension in the second light flow direction Y between the first light output surface 3b and the second light input surface 4a. Depending on the orientations of the light output plane $P_O$ and the light input plane $P_I$, the gap G has a smallest dimension between the first light output surface 3b and the second light input surface 4a. If, as illustrated in the figures, the light output plane $P_O$ and the light input plane $P_I$ are arranged parallel to each other the gap G has a constant width in the second light flow direction Y between the first light output surface 3b and the second light input surface 4a. Test have shown that a suitable size of the gap G is when the gap G has a width in the second light flow direction Y with a smallest dimension between the first light output surface 3b and the second light input surface 4a within the range 0.1-20 mm. With a smallest dimension is in this context meant the smallest distance in the second light flow direction Y between the first light output surface 3b and the second light input surface 4a.

Figure 2A:
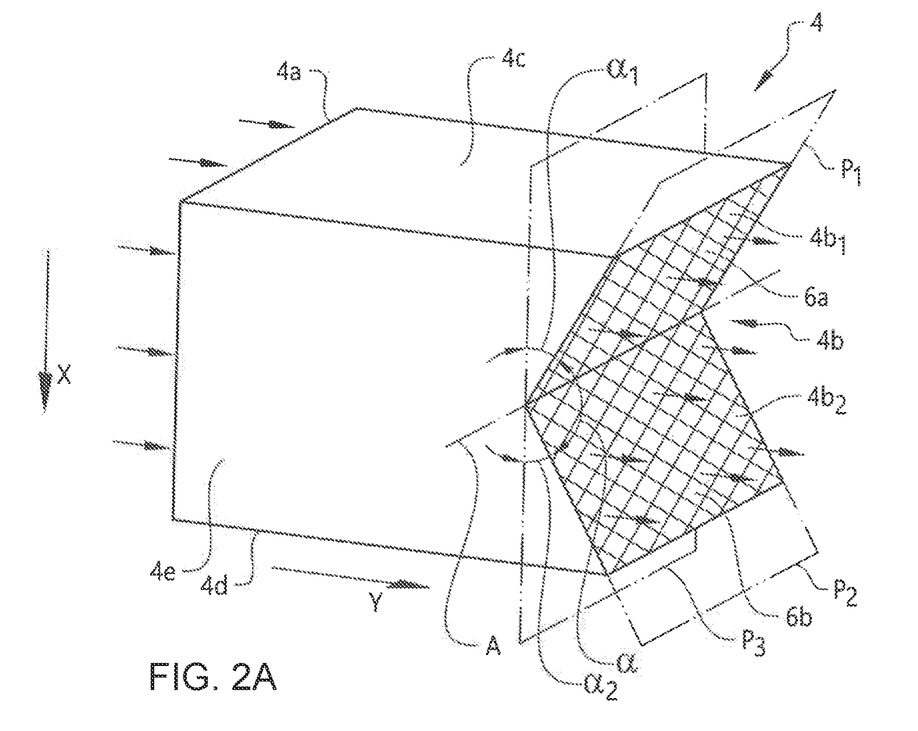
FIG. 2A-2B show schematically, in perspective views the second light guide of the vehicle lighting system according to the disclosure.
Figure 2B:
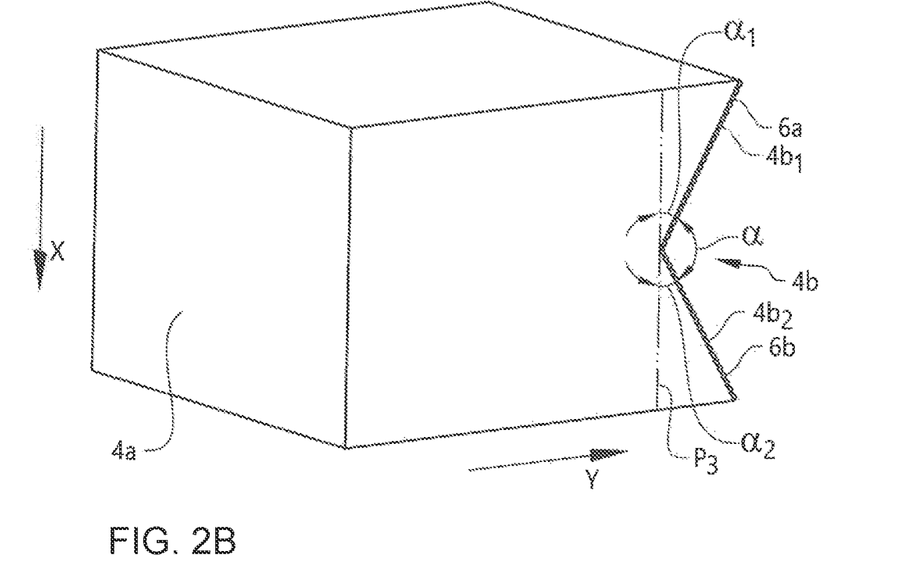
Figure 3:
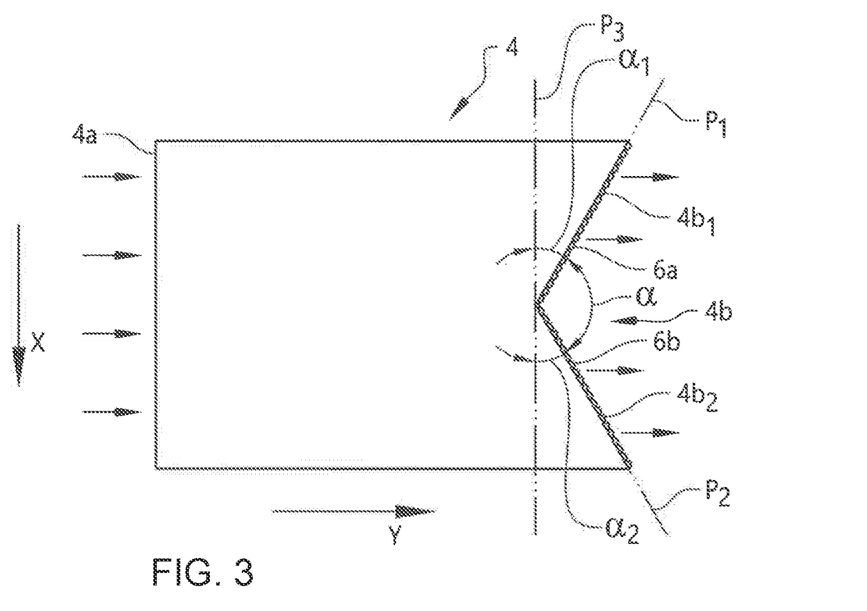
FIG. 3 shows schematically, in a side view the second light guide of the vehicle lighting system according to the disclosure.
Figure 4A:
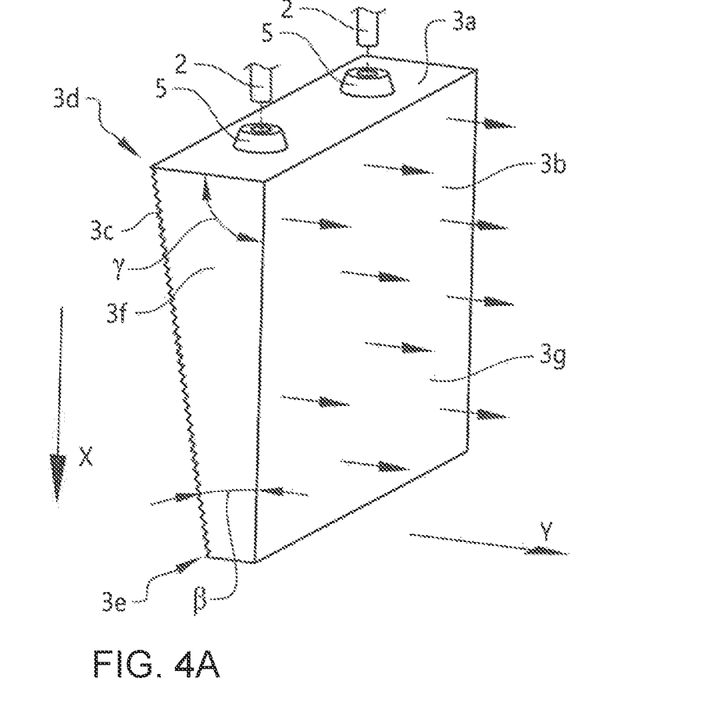
FIG. 4A-4C show schematically, in perspective views the first light guide of the vehicle lighting system according to the disclosure.
Figure 4B:
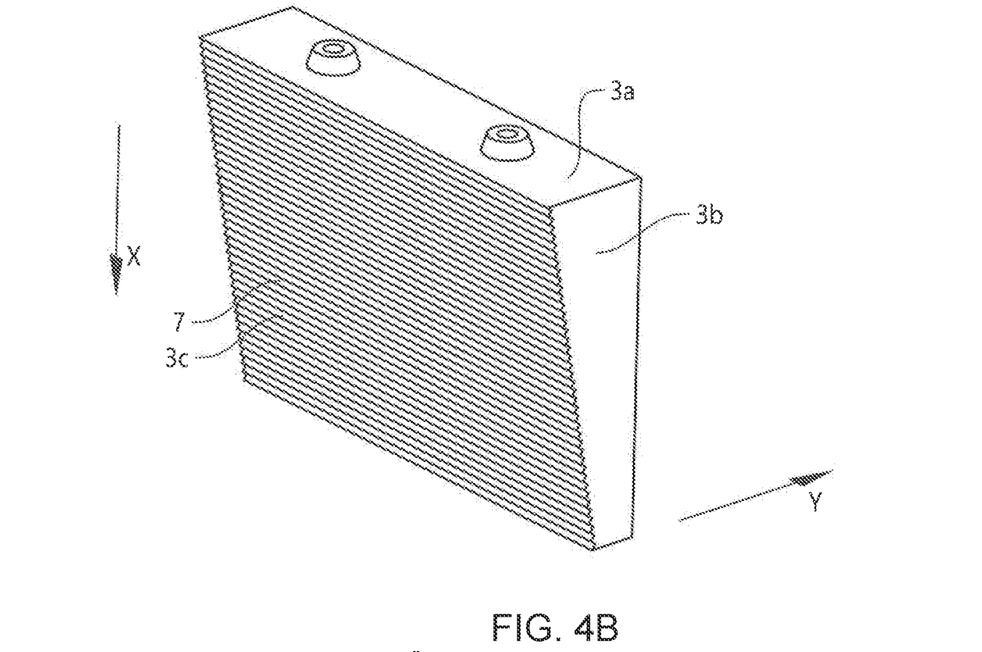
Figure 4C:
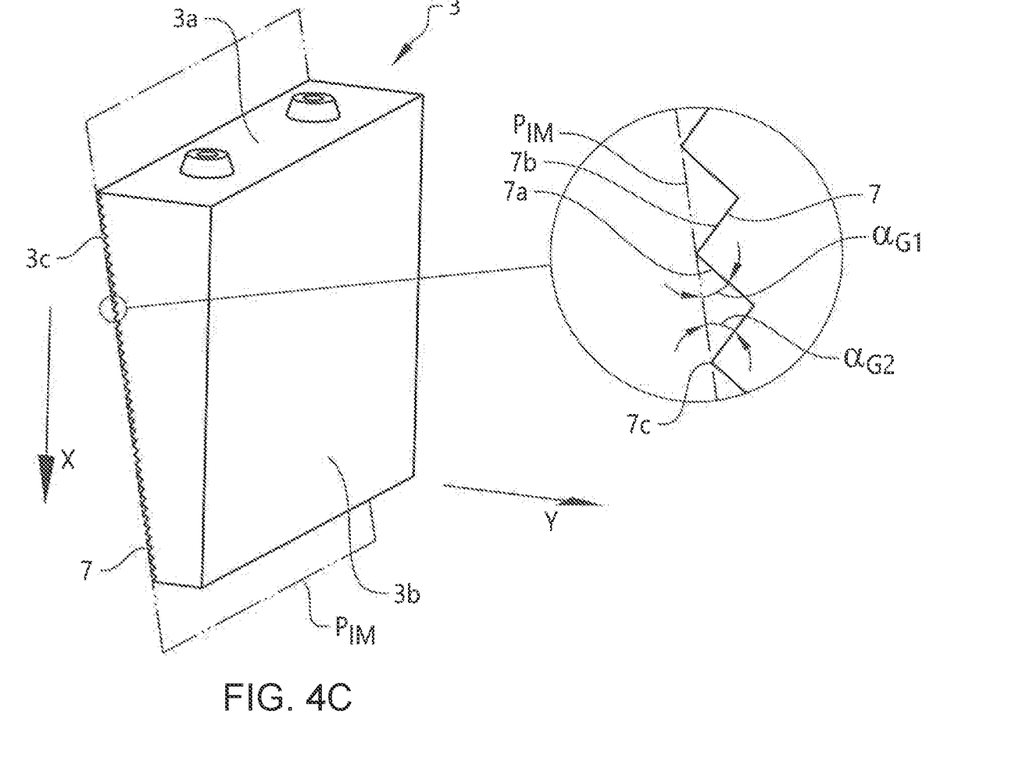

As shown in FIGS. 2A-2B and FIG. 3, the second light guide 4 comprises the second light input surface 4a arranged to receive the incident light from the first light guide 3, and the second light output surface 4b arranged to emit the light received through the second light input surface 4a. The second light output surface 4b comprises a first light emitting surface section $4b_1$ in a first plane $P_1$ and a second light emitting surface section $4b_2$ in a second plane $P_2$. The first plane $P_1$ and the second plane $P_2$ are arranged at a first angle α in relation to each other. The arrangement of the first light emitting surface section $4b_1$ and the second light emitting surface section $4b_2$ in an angular relationship in different planes are providing an efficient light distribution from the light emitting surface when viewed from different angles. Through the arrangement of the planes in the second light emitting surface 4b, an attractive aesthetic and characteristic appearance of the vehicle lighting system 1 is achieved, compared to a more simple construction with a flat surface. The first angle α may be varied depending on the design of the first light guide 3, and suitable second angles α are in the range 30°<α<180°, preferably 70°<α<160°, and more preferably 110°<α<130°. The first plane $P_1$ and the second plane $P_2$ are arranged at the first angle α in relation to each other about a common axis A. The common axis A is extending in a direction non-parallel to the second light flow direction Y.

The second light guide 4 further comprises an upper surface 4c, a lower surface 4d, and two side surfaces 4e.

Upper and lower are in this context referring to the orientation of the surfaces as illustrated in FIGS. 2A-2B and FIG. 3. It should be understood that the surfaces may be oriented in other ways if desired. The upper surface 4c, the lower surface 4d, and the two side surfaces 4e are arranged as planar surfaces parallel to the second light flow direction Y. However, the upper surface 4c, the lower surface 4d, and the two side surfaces 4e may have different shapes, and may be arranged as non-planar surfaces arranged in directions non-parallel to the second light flow direction Y. If suitable, the upper surface 4c, the lower surface 4d, and the two side surfaces 4e may be masked or hidden in a vehicle lighting construction.

The first plane $P_1$ is arranged at a first plane angle $\alpha_1$ in relation to a third plane $P_3$ arranged in a perpendicular relationship to the second light flow direction Y, and the second plane $P_2$ is arranged at a second plane angle $\alpha_2$ in relation to the third plane $P_3$, as shown in FIG. 2A and FIG. 3. The first plane angle $\alpha_1$ and the second plane angle $\alpha_2$ may have the same value or alternatively different values depending on the design of the vehicle lighting system 1. Suitable values for the first plane angle $\alpha_1$ is in the range $0°<\alpha_1<90°$, and suitable values for the second plane angle $\alpha_2$ is in the range $0°<\alpha_2<90°$.

As a non-limiting example, the second light guide 4 may have a configuration where the first angle $\alpha$ is 120°, the first plane angle $\alpha_1$ is 32°, and the second plane angle $\alpha_2$ is 28°.

To secure the emission of light from the second light output surface 4b in the correct directions, the first light emitting surface section $4b_1$ comprises a first prism pattern 6a, and the second light emitting surface section $4b_2$ comprises a second prism pattern 6b. The respective first prism pattern 6a and second prism pattern 6b are arranged to direct the light emitted from the second light guide 4. Since the first light emitting surface section $4b_1$ and the second light emitting surface section $4b_2$ are arranged non-parallel to the second light flow direction, the first prism pattern 6a and the second prism pattern 6b are used for directing the emitted light into desired directions with desired light distributions. The first prism pattern 6a may have any suitable configuration and comprises a plurality of shaped prisms arranged next to each other throughout the surface of the first light emitting surface section $4b_1$. The second prism pattern 6b may have any suitable configuration and comprises a plurality of shaped prisms arranged next to each other throughout the surface of the second light emitting surface section $4b_2$. The first prism pattern 6a may be similar or identical to the second prism pattern 6b, or alternatively, the first prism pattern 6a may be different from the second prism pattern 6b depending on the design of the vehicle lighting system 1. The first prism pattern 6a and the second prism pattern 6b may as an example be configured with a number of individual square prisms when viewed in the second light flow direction Y, where the individual prisms are provided with rounded outer sections. Each side of the squares may have, as an example, a dimension in the range 0.3-10 mm. Smaller dimensions than 0.3 mm may also be used, but dimensions above 0.3 mm are easier and more cost efficient to manufacture. The prism patterns may also have other shapes and designs than square to direct the light in desired directions. The prism patterns are providing a configuration of the vehicle lighting system, where the first light emitting surface section $4b_1$ and the second light emitting surface section $4b_2$ may be perceived as illuminated surfaces by a viewer. The light emitted from the one or more light sources 2 is visible by the viewer from different directions and angles through the optical pattern provided by the prism patterns of the first light emitting surface section $4b_1$ and the second light emitting surface section $4b_2$. However, the one or more light sources 2 as such are not visible due to the configuration with the two light guides and the prism patterns.

The second light guide 4 may be made of any suitable material, such as for example polymethyl methacrylate (PMMA), polycarbonate (PC), a mix of polycarbonate (PC) and acrylonitrile butadiene styrene (ABS), or any other suitable plastic or other material having transparent properties.

As shown in FIGS. 4A-4C and FIG. 5, the first light guide 3 comprises the first light input surface 3a arranged to receive the incident light from the one or more light sources 2. The first light input surface 3a may have a planar configuration or an essentially planar configuration provided with light inlets for the one or more light sources 2. The first light guide 3 further comprises the first light output surface 3b arranged to emit the light received from the one or more light sources 2 through the first light input surface 3a. The first light output surface 3b may have a planar configuration or an essentially planar configuration for an even light distribution. A light reflection surface 3c is arranged for internally reflecting the incident light from the first light input surface 3a toward the first light output surface 3b. Through the reflection of incident light on the light reflection surface 3c the light is redirected from the first light flow direction X to the second light flow direction Y.

The first light guide 3 further comprises an upper end 3d, a lower end 3e, and two side surfaces 3f. Upper and lower are in this context referring to the orientation of the surfaces as illustrated in FIGS. 4A-4C and FIG. 5. It should be understood that the surfaces may be oriented in other ways if desired. The two side surfaces 3f are arranged as planar surfaces parallel to the second light flow direction Y. However, the two side surfaces 3f may have different shapes, and may be arranged as non-planar surfaces arranged in directions non-parallel to the second light flow direction Y.

The first light guide 3 has a tapered cross-sectional configuration, with a tapering extension between the upper end 3d and the lower end 3e. The first light output surface 3b and the light reflection surface 3c are extending between the upper end 3d and the lower end 3e, and as shown in FIGS. 4A-4C and FIG. 5 the first light output surface 3b is arranged at a second angle $\beta$ in relation to the light reflection surface 3c. The second angle $\beta$ is selected to establish an efficient and even light distribution of the light emitted through the first light output surface 3b. The second angle $\beta$ may be varied depending on the design of the first light guide 3, and suitable second angles $\beta$ are for example in the range $0°<\beta<10°$.

As further shown in FIGS. 4A-4C and FIG. 5 the first light input surface 3a is arranged at the upper end 3d. The first light input surface 3a is arranged at a third angle $\gamma$ in relation to the first light output surface 3b. The third angle $\gamma$ may be varied depending on the design of the first light guide 3, and suitable third angles $\gamma$ may for example be in the range $70°<\gamma<110°$, preferably 90°.

Figure 5:
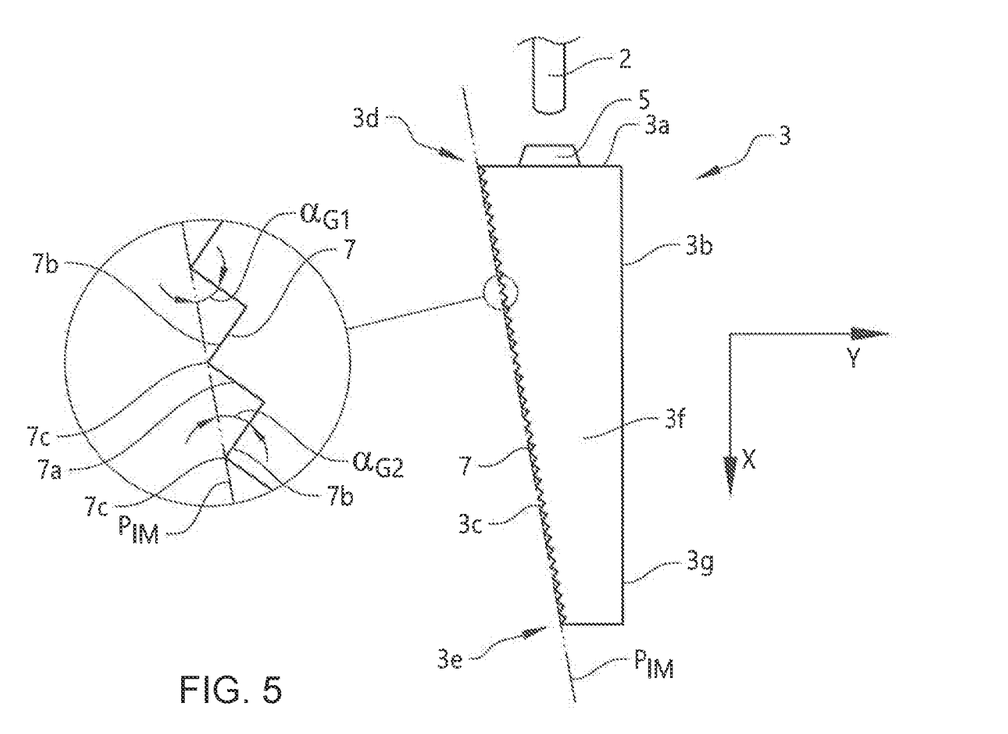
FIG. 5 shows schematically, in a side view the first light guide of the vehicle lighting system according to the disclosure.

As illustrated in FIG. 1b and FIG. 5, the first light output surface 3b may for example comprise a graining structure 3g or other surface finish layer for a more even light distribution. The graining structure 3g may be of any suitable texture or coarseness. If the first light guide 3 is made of a suitable plastic material, the graining of the first light output surface 3b can be measured for example according to the VDI 3400 standard. The graining structure 3g can be achieved when moulding the first light guide 3, and the mould used is then prepared with a suitable graining structure.

The light reflection surface $3c$ comprises a plurality of grooves 7 extending into the first light guide 3. The plurality of grooves are arranged to redirect the incident light from the one or more light sources 2, as illustrated in FIG. 5. The grooves 7 are arranged between the upper end $3d$ and the lower end $3e$ in a parallel or essentially parallel relationship to the first light input surface $3a$. Each groove 7 has a V-shaped configuration comprising a first groove angle $\alpha_{G1}$ and a second groove angle $\alpha_{G2}$, as illustrated more in detail in FIG. 4C. The groove angles are chosen so that an efficient reflection of the incident light from the one or more light sources 2 is achieved. The design and angles of the grooves 7 may be varied depending on the design of the first light guide 3. Each groove 7 is defined as an inwardly oriented V-shaped groove extending into the first light guide, where each groove 7 has an upper groove side $7a$ and a lower groove side $7b$. Upper and lower are in this context referring to the orientation of the first light guide embodiment as illustrated in FIG. 5. It should be understood that the first light guide may be oriented in other directions if desired. The first groove angle win and the second groove angle $\alpha_{G2}$ are calculated as the respective angles from an imaginary plane $P_{IM}$ to the upper groove side $7a$ and the lower groove side $7b$ respectively. The imaginary plane $P_{IM}$ is extending along the light reflection surface $3c$. The imaginary plane $P_{IM}$ is, as shown in FIG. 5, a plane arranged at outer groove connection points $7c$ of the grooves 7. The outer groove connection points $7c$ are arranged between the upper groove sides $7a$ and the lower groove sides $7b$ of the grooves 7. The outer groove connection points $7c$ are thus connecting outer portions of each groove 7, where the outer groove connection point $7c$ is connecting the upper groove side $7a$ and lower groove side $7b$ of each groove 7. In the embodiments shown, the grooves 7 are arranged directly adjacent each other. However, the grooves 7 may as an alternative (not shown in the figures) be arranged at a suitable distance from each other, where the outer groove connection points $7c$ are arranged as wall sections of the light reflecting surface $3c$ interconnecting the grooves 7. Tests have shown that for a first light guide 3 made of PMMA, where the second angle β is greater than 0° and smaller than 10°, suitable first groove angles $\alpha_{G1}$ are as a non-limiting example in the range 30° to 45°, and suitable second groove angles $\alpha_{G2}$ are as a non-limiting example in the range 30° to 45°. These first and second groove angles may also be suitable for other materials. The grooves 7 arranged on the light reflection surface $3c$ may be configured with the same groove angles or alternatively the grooves 7 may have different groove angles.

Figure 6:
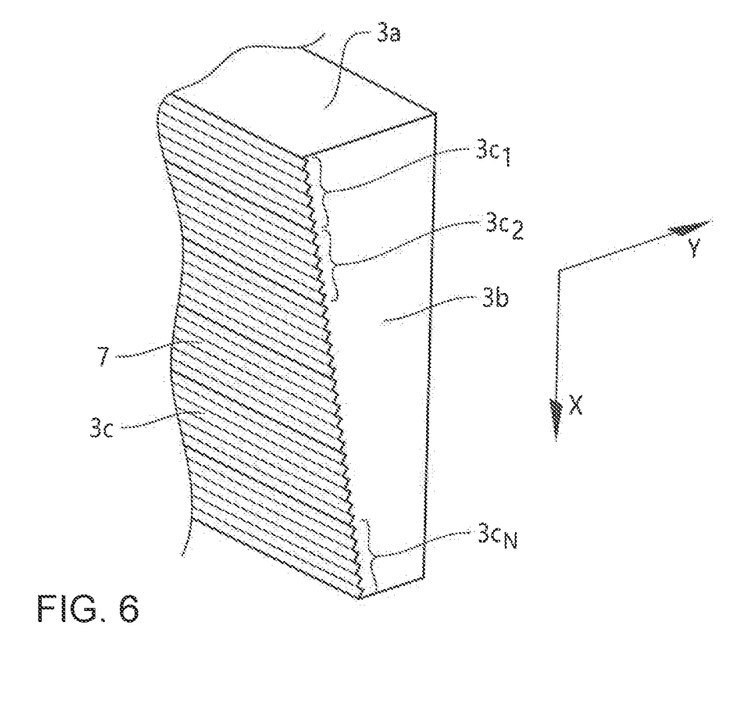
FIG. 6 shows schematically, in a perspective view an alternative embodiment of the first light guide according to the disclosure.

As illustrated in FIG. 6a, the light reflection surface $3c$ of the first light guide 6 may comprise two or more light reflection sections $3c_1, 3c_2 \ldots 3c_N$. Each of the two or more light reflection sections $3c_1, 3c_2 \ldots 3c_N$ comprises a plurality of grooves 7 arranged to redirect the incident light from the one or more light sources 2. The grooves 7 of each light reflection section $3c_1, 3c_2 \ldots 3c_N$ are arranged between an upper end $3d_1, 3d_2 \ldots 3d_N$ and a lower end $3e_1, 3e_2 \ldots 3e_N$ in a parallel or essentially parallel relationship to the first light input surface $3a$. Each groove 7 has a V-shaped configuration comprising a first groove angle win and a second groove angle $\alpha_{G2}$. The groove angles are chosen so that an efficient reflection of the incident light from the one or more light sources 2 is achieved. The design and angles of the grooves 7 may be varied depending on the design of the first light guide 3. The grooves 7 in each light reflection section $3c_1, 3c_2 \ldots 3c_N$ may have configurations different from grooves 7 in other light reflection sections. The shape and groove angles may differ between the light reflection sections $3c_1, 3c_2 \ldots 3c_N$. Further, the number of grooves in each light reflection section $3c_1, 3c_2 \ldots 3c_N$ may vary depending on the design of the first light guide 3.

As shown in the figures, the first input surface $3a$ of the first light guide 3 may comprise one or more lenses 5 arranged to direct the light emitted from the one or more light sources 2 into the first light guide 3. The first input surface $3a$ may be provided with one lens 5 for each light source 2. The lenses 5 are arranged to direct and distribute the light emitted from the one or more light sources 2 in a suitable manner into the first light guide 3 in order to achieve a desired first light flow direction X and reflection within the first light guide 3. The more light reflected on the light reflection surface $3c$, the better light output is accomplished through the first light output surface $3b$. Each of the one or more light sources 2 is cooperating with one of the one or more lenses 5, and thus the first light guide 3 may be provided with one lens 5 for each light source 2. In the embodiment shown in FIGS. 4A-4B and FIG. 5 the first light guide 3 comprises two lenses 5, one lens 5 for each of the two light sources 2. The lenses may be configured in different ways depending on the design of the first light guide.

Figure 7A:
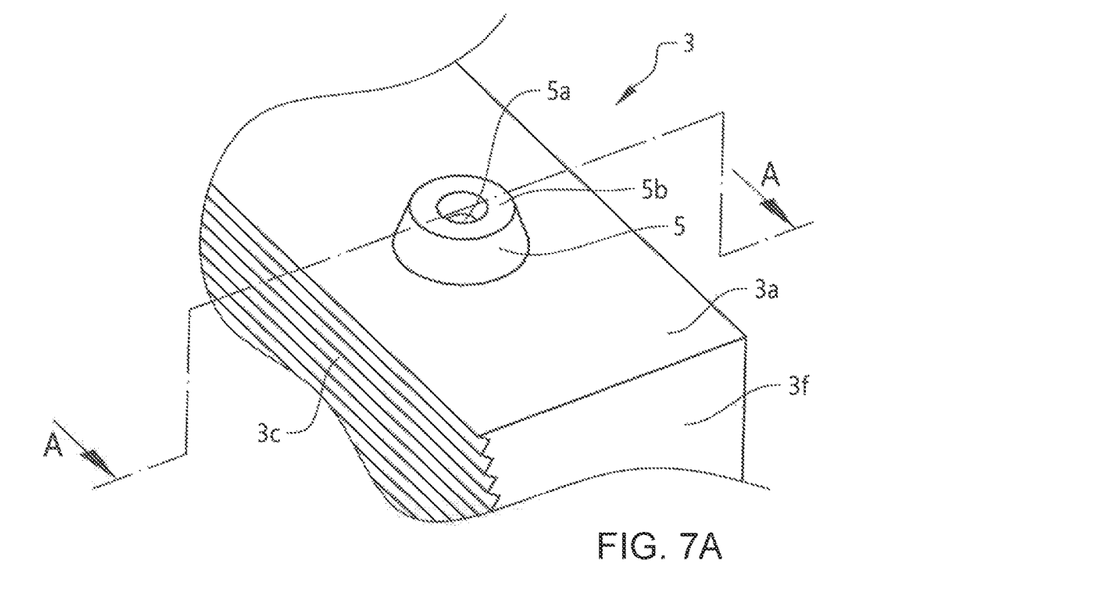
FIG. 7A-7B show schematically, in a perspective view and in a side view a lens of the first light guide according to the disclosure.
Figure 7B:
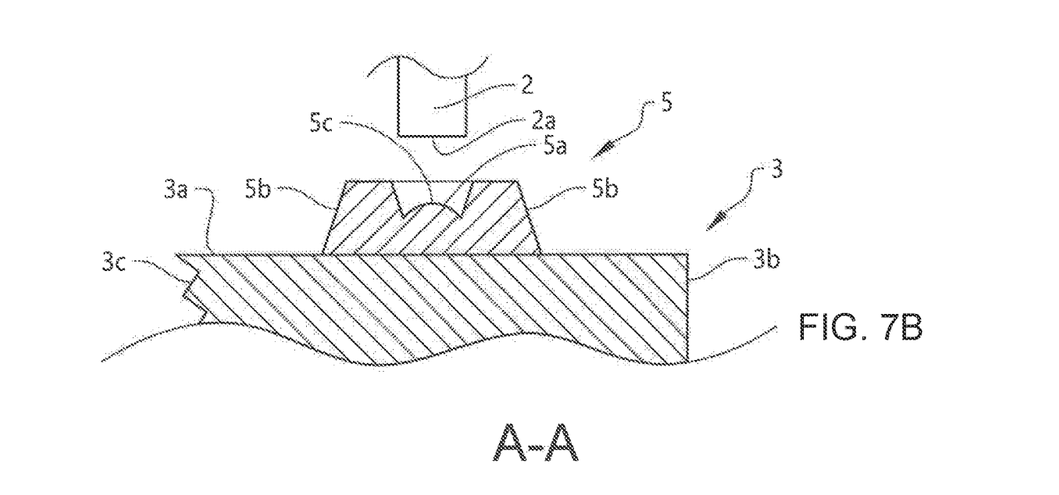

A suitable configuration of the one or more lenses 5 are for example shown in FIGS. 7A-7B. The one or more lenses 5 may be attached as separate elements to the first light input surface $3a$ or alternatively be moulded into the structure of the first light guide 3. Each lens 5 may comprise a curved lens surface $5a$ surrounded by a lens sidewall $5b$. The lens surface $5a$ is, as shown in the figures, having a convex shape and the light source 2 is arranged in a direction above the lens surface $5a$. The lens surface $5a$ has a lens top surface centre point $5c$, and a light source centre point $2a$ of the light source 2 is arranged in the first flow direction X above the lens top surface centre point $5c$. The distance between the light source centre point $2a$ and the lens top surface centre point $5c$ in the first flow direction X may vary depending on the design of the first light guide 3, and may for example be in the range 0.1-20 mm.

The first light guide 3 may be made of any suitable material, such as for example polymethyl methacrylate (PMMA), polycarbonate (PC), a mix of polycarbonate (PC) and acrylonitrile butadiene styrene (ABS), or any other suitable plastic or other material having transparent properties.

The vehicle lighting system 1 can through the construction of the first light guide 3 and the second light guide 4 be scalable in size. Through the scalability of the vehicle lighting system 1 the dimensions of the first light guide 3 and the second light guide 4 may be varied, and further the number of light sources 2 used may differ between different vehicle lighting systems 1. The distance between the light sources 2 can be varied to alter the intensity of the light emitted from second light output surface $4b$. The more the light sources 2 are separated, the higher risk for an uneven light pattern in the second light output surface $4b$. Further, if the light sources are arranged too close to each other the vehicle lighting system 1 may not be energy efficient enough. A narrow system may only need one light source 2 and wider vehicle lighting systems may need two or more light sources 2.

Figure 8:
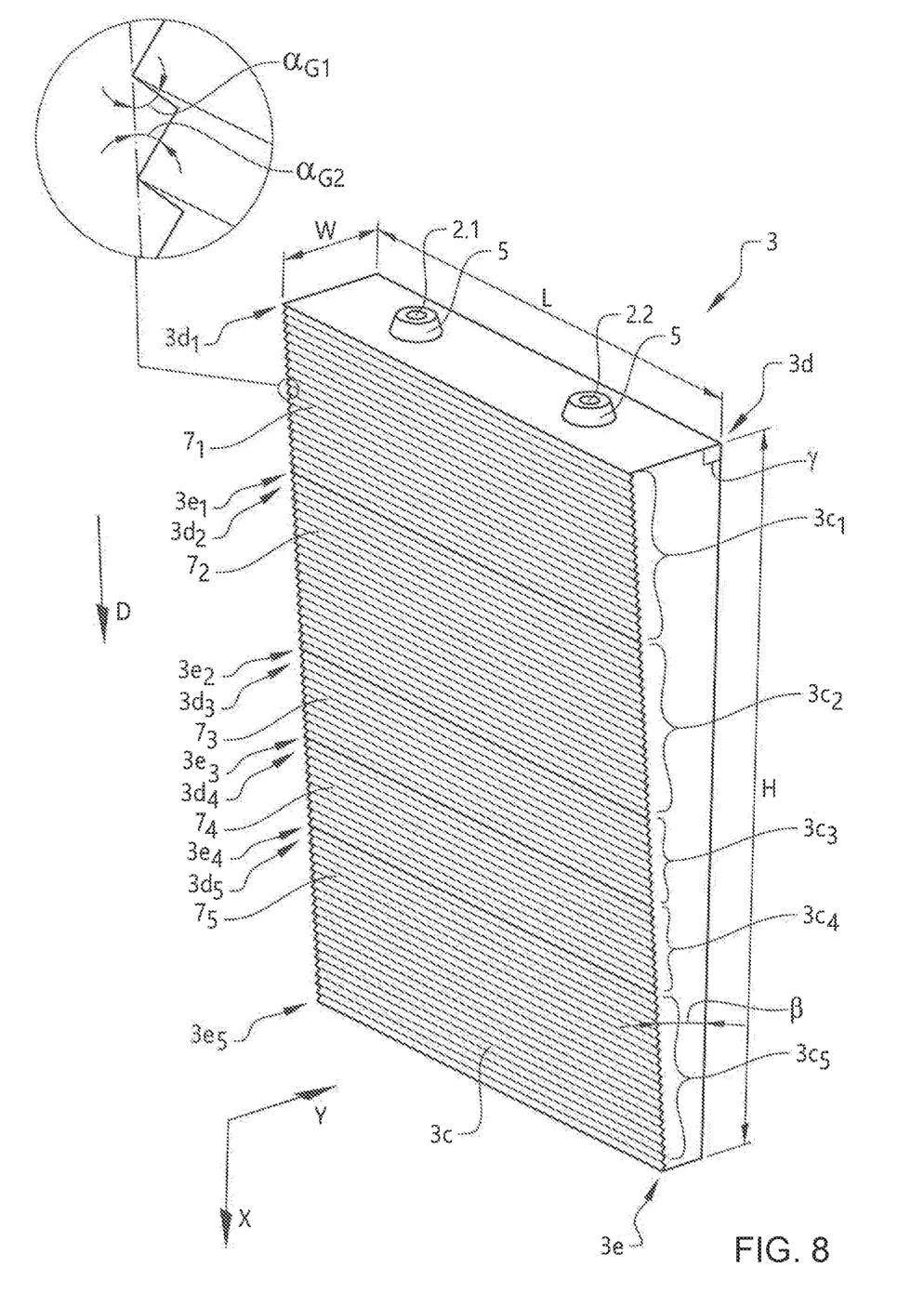
FIG. 8 shows schematically, in a perspective view an example embodiment of the first light guide of the vehicle lighting system according to the disclosure.

To achieve an even light distribution with an even light pattern in the first light guide 3, the suitable number of light sources 2 used are depending on the surface area of the first light output surface $3b$. The larger area of the first light output surface $3b$, the higher number of light sources 2 may be used. The first light guide 3 may for example have a tapered configuration as shown in FIG. 8, with a height H measured in the first flow direction X, a width W measured in the second flow direction Y, and a length L measured in a direction perpendicular to the first flow direction X and the second flow direction Y. The length L may for example be varied to achieve different surface areas of the first light output surface 3b. If for example, a predetermined height H is used in a light guide configuration and the length L is varied for different designs of the first light guide 3, the number of light sources used to achieve desired properties are depending on the length L.

If in a non-limiting example, the height H is predetermined to a specific value, and the surface area of the first light output surface 3b is 10 cm$^2$, only one light source may be used to achieve desired light distribution properties. If the length L is increased for the same predetermined height H so that the surface area is 20 cm$^2$, two light sources 2 may be used to achieve desired light distribution properties. However, tests have shown that if increasing the length L further, the relationship between the number of light sources 2 and the length L is not necessarily linear in order to achieve desired light distribution properties. If for example the length L is even further increased for the same predetermined height H so that the surface area is 40 cm$^2$, only three light sources 2 may be needed to achieve desired light distribution properties instead of using four light sources 2. The use of four light sources 2 may lead to unnecessary light intensities and higher costs for the additional light source used.

An example embodiment of the first light guide 3 will be described below with reference to FIG. 8. In this example, the first flow direction X is perpendicular to the second flow direction Y. The first light guide 3 is made of polymethyl methacrylate (PMMA), and has a height H measured in the first flow direction X of about 100 mm, a width W measured in the second flow direction Y of about 11 mm, and a length L measured in a direction perpendicular to the first flow direction X and the second flow direction Y of about 37 mm. In this example embodiment, the second angle β is 5°, and the third angle γ is 90°.

In the example embodiment in FIG. 8, two light sources 2.1, 2.2 are used to emit light into the first light guide 3. The first light guide 3 comprises five light reflection sections $3c_1$, $3c_2$, $3c_3$, $3c_4$, $3c_5$, extending along the light reflection surface 3c from the upper end 3d to the lower end 3e of the first light guide 3. Each of the five light reflection sections $3c_1$, $3c_2$, $3c_3$, $3c_4$, $3c_5$ comprises a plurality of grooves 7 arranged to redirect the incident light from the two light sources 2.1, 2.2. In the same way as illustrated in FIG. 6b, the grooves 7 of each light reflection section $3c_1$, $3c_2$, $3c_3$, $3c_4$, $3c_5$ are arranged between an upper end $3d_1$, $3d_2$, $3d_3$, $3d_4$, $3d_5$ and a lower end $3e_1$, $3e_2$, $3e_3$, $3e_4$, $3e_5$ of each light reflection section $3c_1$, $3c_2$, $3c_3$, $3c_4$, $3c_5$ in a parallel or essentially parallel relationship to the first light input surface 3a. The grooves 7 in each light reflection section $3c_1$, $3c_2$, $3c_3$, $3c_4$, $3c_5$ have configurations different from grooves 7 in other light reflection sections.

As illustrated in FIG. 8, the first light reflection section $3c_1$ comprises a first set of grooves $7_i$. The first light reflection section $3c_1$ is extending from the upper end 3d of the first light guide 3 and a distance of about 25% of the total extension of the light reflection surface 3c in a downwards direction D between the upper end 3d and the lower end 3e of the first light guide 3. Each groove $7_1$ in the first light reflection section $3c_1$ has a V-shaped configuration with a first groove angle $\alpha_{G1}$ and a second groove angle $\alpha_{G2}$. The first groove angle $\alpha_{G1}$ and the second groove angle $\alpha_{G2}$ are chosen so that an efficient reflection of the incident light from the two light sources 2.1, 2.2 is achieved. In the first light reflection section $3c_1$, the first groove angles $\alpha_{G1}$ are ranging from 30° to 38°, and the second groove angles $\alpha_{G2}$ are 40°. The first groove angles $\alpha_{G1}$ are gradually changed between the upper end $3d_1$ and the lower end $3e_1$ of the first light reflection section $3c_1$. A first groove arranged closest to the upper end $3d_1$ has a first groove angle $\alpha_{G1}$ of 30°. A last groove arranged closest to the lower end $3e_1$ has a first groove angle $\alpha_{G1}$ of 38°. Each groove $7_1$ in the first light reflection section $3c_1$ has an extension in the downwards direction D along the first light reflection section $3c_1$ from the upper end $3d_1$ to the lower end $3e_1$ of about 1.4 mm.

As illustrated in FIG. 8, the second light reflection section $3c_2$ comprises a second set of grooves $7_2$. The second light reflection section $3c_2$ is extending from the lower end $3e_1$ of the first light reflection section $3c_1$ and a distance of about 25% of the total extension of the light reflection surface 3c in the downwards direction D towards the lower end 3e of the first light guide 3. Each groove $7_2$ in the second light reflection section $3c_2$ has a V-shaped configuration with a first groove angle $\alpha_{G1}$ and a second groove angle $\alpha_{G2}$. The first groove angle $\alpha_{G1}$ and the second groove angle $\alpha_{G2}$ are chosen so that an efficient reflection of the incident light from the two light sources 2.1, 2.2 is achieved. In the second light reflection section $3c_2$, the first groove angles $\alpha_{G1}$ are ranging from 38° to 39°, and the second groove angles $\alpha_{G2}$ are 40°. The first groove angles $\alpha_{G1}$ are gradually changed between the upper end $3d_2$ and the lower end $3e_2$ of the second light reflection section $3c_2$. A first groove arranged closest to the upper end $3d_2$ has a first groove angle $\alpha_{G1}$ of 38°. A last groove arranged closest to the lower end $3e_2$ has a first groove angle $\alpha_{G1}$ of 39°. Each groove $7_2$ in the second light reflection section $3c_2$ has an extension in the downwards direction D along the second light reflection section $3c_2$ from the upper end $3d_2$ to the lower end $3e_2$ of about 1.4 mm.

As illustrated in FIG. 8, the third light reflection section $3c_3$ comprises a third set of grooves $7_3$. The third light reflection section $3c_3$ is extending from the lower end $3e_2$ of the second light reflection section $3c_2$ and a distance of about 12.5% of the total extension of the light reflection surface 3c in the downwards direction D towards the lower end 3e of the first light guide 3. Each groove $7_3$ in the third light reflection section $3c_3$ has a V-shaped configuration with a first groove angle $\alpha_{G1}$ and a second groove angle $\alpha_{G2}$. The first groove angle $\alpha_{G1}$ and the second groove angle $\alpha_{G2}$ are chosen so that an efficient reflection of the incident light from the two light sources 2.1, 2.2 is achieved. In the third light reflection section $3c_3$, the first groove angles $\alpha_{G1}$ are ranging from 39° to 36°, and the second groove angles $\alpha_{G2}$ are 40°. The first groove angles $\alpha_{G1}$ are gradually changed between the upper end $3d_3$ and the lower end $3e_3$ of the third light reflection section $3c_3$. A first groove arranged closest to the upper end $3d_3$ has a first groove angle $\alpha_{G1}$ of 39°. A last groove arranged closest to the lower end $3e_3$ has a first groove angle $\alpha_{G1}$ of 36°. Each groove $7_3$ in the third light reflection section $3c_3$ has an extension in the downwards direction D along the third light reflection section $3c_3$ from the upper end $3d_3$ to the lower end $3e_3$ of about 1.1 mm.

As illustrated in FIG. 8, the fourth light reflection section $3c_4$ comprises a fourth set of grooves $7_4$. The fourth light reflection section $3c_4$ is extending from the lower end $3e_3$ of the third light reflection section $3c_3$ and a distance of about 12.5% of the total extension of the light reflection surface 3c in the downwards direction D towards the lower end 3e of the first light guide 3. Each groove $7_4$ in the fourth light reflection section $3c_4$ has a V-shaped configuration with a first groove angle $\alpha_{G1}$ and a second groove angle $\alpha_{G2}$. The first groove angle $\alpha_{G1}$ and the second groove angle $\alpha_{G2}$ are chosen so that an efficient reflection of the incident light from the two light sources 2.1, 2.2 is achieved. In the fourth light reflection section $3c_4$, the first groove angles $\alpha_{G1}$ are ranging from 36° to 37°, and the second groove angles $\alpha_{G2}$ are 40°. The first groove angles $\alpha_{G1}$ are gradually changed between the upper end $3d_4$ and the lower end $3e_4$ of the fourth light reflection section $3c_4$. A first groove arranged closest to the upper end $3d_4$ has a first groove angle win of 36°. A last groove arranged closest to the lower end $3e_4$ has a first groove angle $\alpha_{G1}$ of 37°. Each groove $7_4$ in the fourth light reflection section $3c_4$ has an extension in the downwards direction D along the fourth light reflection section $3c_4$ from the upper end $3d_4$ to the lower end $3e_4$ of about 1 mm.

As illustrated in FIG. 8, the fifth light reflection section $3c_5$ comprises a fifth set of grooves $7_5$. The fifth light reflection section $3c_5$ is extending from the lower end $3e_4$ of the fourth light reflection section $3c_4$ and a distance of about 25% of the total extension of the light reflection surface $3c$ in the downwards direction D towards the lower end $3e$ of the first light guide 3. Each groove $7_5$ in the fifth light reflection section $3c_5$ has a V-shaped configuration with a first groove angle $\alpha_{G1}$ and a second groove angle $\alpha_{G2}$. The first groove angle $\alpha_{G1}$ and the second groove angle $\alpha_{G2}$ are chosen so that an efficient reflection of the incident light from the two light sources 2.1, 2.2 is achieved. In the fifth light reflection section $3c_5$, the first groove angles $\alpha_{G1}$ are 37°, and the second groove angles $\alpha_{G2}$ are 40°. Each groove $7_5$ in the fifth light reflection section $3c_5$ has an extension in the downwards direction D along the fifth light reflection section $3c_5$ from the upper end $3d_5$ to the lower end $3e_5$ of about 1 mm. The lower end $3e_5$ of the fifth light reflection section $3c_5$ is corresponding to the lower end $3e$ of the first light guide 3.

In the example embodiment of the first light guide 3 described above with reference to FIG. 8, the first light guide 3 is made of polymethyl methacrylate (PMMA). If using other materials, the angles used may be different from the ones described depending on the optical properties and refractive index of the material used.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

1: Vehicle lighting system
2: Light source
2a: Light source centre point
3: First light guide
3a: First light input surface, First light guide
3b: First light output surface, First light guide
3c: Light reflection surface, First light guide
3d: Upper end, First light guide
3e: Lower end, First light guide
3f: Side surface, First light guide
3g: Graining structure, First light guide
4: Second light guide
4a: Second light input surface, Second light guide
4b: Second light output surface, Second light guide
4b1: First light emitting surface section
4b2: Second light emitting surface section
4c: Upper surface, Second light guide
4d: Lower surface, Second light guide
4e: Side surface, Second light guide
5: Lens
5a: Lens surface
5b: Lens sidewall
5c: Lens top surface centre point
6a: First prism pattern
6b: Second prism pattern
7: Groove
7a: Upper groove side
7b: Lower groove side
7c: Outer groove connection point

What is claimed is:

1. A vehicle lighting system comprising one or more light sources, a first light guide, and a second light guide,
wherein the one or more light sources are arranged to emit light into the first light guide, the first light guide is arranged to emit incident light from the one or more light sources into the second light guide, and the second light guide is arranged to emit incident light from the first light guide,
wherein the first light guide is arranged to redirect the incident light from the one or more light sources from a first light flow direction to a second light flow direction, and wherein the second light guide is arranged following the first light guide in the second light flow direction,
wherein the first light guide comprises a first light input surface arranged to receive the incident light from the one or more light sources, a first light output surface arranged to emit the light received from the one or more light sources through the first light input surface, and a light reflection surface arranged to internally reflecting the incident light from the first light input surface toward the first light output surface,
wherein the second light guide comprises a second light input surface arranged to receive the incident light from the first light guide, and a second light output surface arranged to emit the light received through the second light input surface,
wherein the second light output surface comprises a first light emitting surface section in a first plane and a second light emitting surface section in a second plane, wherein the first plane and the second plane are arranged at a first angle in relation to each other and each of the first light emitting surface section and the second light emitting surface section emit light with a light ray angle distribution directed along the second light flow direction, and
wherein the second light guide is a continuous integral solid structure between the second light input surface and each of the first light emitting surface section and the second light emitting surface section of the second light output surface.

2. The vehicle lighting system according to claim 1, wherein the first plane and the second plane are arranged at the first angle in relation to each other about a common axis extending in a direction non-parallel to the second light flow direction.

3. The vehicle lighting system according to claim 1, wherein the first light output surface is arranged in a light output plane and the second light input surface is arranged in a light input plane, wherein a gap is formed between the first light output surface and the second light input surface.

4. The vehicle lighting system according to claim 3, wherein the gap has a smallest dimension between the first light output surface and the second light input surface in the second light flow direction Y within the range 0.1-20 mm.

5. The vehicle lighting system according to claim 3, wherein the light output plane and the light input plane are arranged parallel or essentially parallel to each other.

6. The vehicle lighting system according to claim 3, wherein the light output plane and the light input plane are arranged perpendicular or essentially perpendicular to the second light flow direction.

7. The vehicle lighting system according to claim 1, wherein the first light guide has a tapered cross-sectional configuration between an upper end and a lower end, wherein the first light output surface and the light reflection surface are extending between the upper end and the lower end, wherein the first light output surface is arranged at a second angle in relation to the light reflection surface.

8. The vehicle lighting system according to claim 7, wherein the first light input surface is arranged at the upper end, and wherein the first light input surface is arranged at a third angle in relation to the first light output surface.

9. The vehicle lighting system according to claim 7, wherein the light reflection surface comprises a plurality of grooves arranged to redirect the incident light from the one or more light sources, wherein the grooves are arranged between the upper end and the lower end in a parallel or essentially parallel relationship to the first light input surface.

10. The vehicle lighting system according to claim 9, wherein each groove has a V-shaped configuration comprising a first groove angle and a second groove angle.

11. The vehicle lighting system according to claim 9, wherein the light reflection surface comprises two or more light reflection sections, wherein the grooves in the respective light reflecting sections have different configurations.

12. The vehicle lighting system according to claim 1, wherein the area of the first light output surface is greater than the area of the second light input surface.

13. The vehicle lighting system according to claim 1, wherein the first input surface comprises one or more lenses arranged to direct the light emitted from the one or more light sources into the first light guide, wherein each of the one or more light sources is cooperating with one of the one or more lenses.

14. The vehicle lighting system according to claim 1, wherein the first light emitting surface section comprises a first prism pattern, and wherein the second light emitting surface section comprises a second prism pattern, wherein the respective first and second prism patterns are arranged to direct the light emitted from the second light guide.

15. The vehicle lighting system according to claim 1, wherein the first light guide is arranged following the one or more light sources in the first light flow direction.

16. The vehicle lighting system according to claim 1, wherein the first light output surface comprises a graining structure.

17. The vehicle lighting system according to claim 1, wherein a combined light ray angle distribution of the light emitted from the first light emitting surface section and the second light emitting surface section is without visible light intensity fluctuations.

18. The vehicle lighting system according to claim 1, wherein the second light output surface is a light emitting output surface of the vehicle lighting system through which light is emitted to the surrounding environment.

* * * * *